United States Patent
Koenig (10) Patent No.: US 11,549,300 B2
(45) Date of Patent: Jan. 10, 2023

(54) CONTROL DEVICE AND METHOD FOR CONTROLLING A WINDOW LIFTER WITH ANTI-TRAP PROTECTION FOR A MOTOR VEHICLE

(71) Applicant: Bayerische Motoren Werke Aktiengesellschaft, Munich (DE)

(72) Inventor: Alexander Koenig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 49 days.

(21) Appl. No.: 17/048,170

(22) PCT Filed: Apr. 15, 2019

(86) PCT No.: PCT/EP2019/059631
§ 371 (c)(1),
(2) Date: Oct. 16, 2020

(87) PCT Pub. No.: WO2019/211086
PCT Pub. Date: Nov. 7, 2019

(65) Prior Publication Data
US 2021/0164280 A1    Jun. 3, 2021

(30) Foreign Application Priority Data
May 4, 2018   (DE) ................. 10 2018 206 935.2

(51) Int. Cl.
*E05F 15/00* (2015.01)
*E05F 15/40* (2015.01)
(Continued)

(52) U.S. Cl.
CPC ............ *E05F 15/40* (2015.01); *E05F 15/695* (2015.01); *E05F 15/70* (2015.01); *B60J 1/12* (2013.01);
(Continued)

(58) Field of Classification Search
CPC ......... E05F 15/695; E05F 15/70; E05F 15/40; E05F 15/41; E05F 2015/487;
(Continued)

(56) References Cited

U.S. PATENT DOCUMENTS

| 6,630,808 | B1 | 10/2003 | Kliffken et al. |
| 7,038,413 | B2* | 5/2006 | Onozawa .................. G05B 9/02 |
| | | | 318/443 |

(Continued)

FOREIGN PATENT DOCUMENTS

| CN | 101117873 A | 2/2008 |
| CN | 102204051 A | 9/2011 |

(Continued)

OTHER PUBLICATIONS

International Search Report (PCT/ISA/210) issued in PCT Application No. PCT/EP2019/059631 dated Sep. 30, 2019 with English translation (five (5) pages).

(Continued)

*Primary Examiner* — Chi Q Nguyen
(74) *Attorney, Agent, or Firm* — Crowell & Moring LLP (57) ABSTRACT

The invention relates to a control device for controlling an externally-powered window lifter with anti-trap protection for a motor vehicle window. A control device of this type is designed to determine that an operating element for closing the window is actuated and, in response thereto, the window is moved in the closing direction. The control device is further designed to determine that the functional activity of the anti-trap protection is no longer guaranteed. In the case of a control device and in the event that it has been determined that the functional activity of the anti-trap protection is not guaranteed, the window lifter is actuated in response to the actuation of the operating element in such a way that the window is moved at a lower displacement speed (Continued)

in the closing direction when compared with the displacement speed with guaranteed functionality. In the case of an alternative control device and in the event that it has been determined that the functional activity of the anti-trap protection is not guaranteed, the window lifter is actuated in response to the actuation of the operating element with a predetermined actuation sequence of the window lifters in such a way that the window is displaced in the closing direction starting from the idle state.

14 Claims, 4 Drawing Sheets (51) Int. Cl.
| | | |
|---|---|---|
| *E05F 15/695* | (2015.01) | |
| *E05F 15/70* | (2015.01) | |
| *E05F 15/41* | (2015.01) | |
| *B60J 1/12* | (2006.01) | |

(52) U.S. Cl.
CPC .......... *E05F 15/41* (2015.01); *E05Y 2201/434* (2013.01); *E05Y 2400/36* (2013.01); *E05Y 2400/40* (2013.01); *E05Y 2400/50* (2013.01); *E05Y 2400/54* (2013.01); *E05Y 2900/55* (2013.01)

(58) Field of Classification Search
CPC ........... E05Y 2201/434; E05Y 2400/54; E05Y 2400/40; E05Y 2400/36; E05Y 15/42; E05Y 2900/55; E05Y 2400/50; B60J 1/12
USPC .................................................. 49/26, 28, 31
See application file for complete search history.

(56) References Cited

U.S. PATENT DOCUMENTS

| | | | | |
|---|---|---|---|---|
| 7,250,736 | B2* | 7/2007 | Hirai | H02H 7/0851 |
| | | | | 318/434 |
| 7,346,272 | B2* | 3/2008 | Franzan | H02H 7/0851 |
| | | | | 318/803 |
| 7,359,783 | B2* | 4/2008 | Vives | E05F 15/41 |
| | | | | 318/446 |
| 8,089,237 | B2* | 1/2012 | Bernhard | H02H 7/0851 |
| | | | | 318/281 |
| 8,143,832 | B2* | 3/2012 | Holzmann | E05F 15/40 |
| | | | | 49/350 |
| 9,255,435 | B2* | 2/2016 | Weidenbacher | E05F 15/695 |
| 10,493,826 | B2* | 12/2019 | Schwarz | E05F 15/60 |
| 2004/0172879 | A1 | 9/2004 | Regnet et al. | |
| 2006/0220604 | A1* | 10/2006 | Hirai | H02H 7/0851 |
| | | | | 318/286 |
| 2008/0036406 | A1 | 2/2008 | Kawai et al. | |
| 2009/0058340 | A1* | 3/2009 | Sakai | G05B 9/02 |
| | | | | 318/434 |
| 2011/0192088 | A1* | 8/2011 | Zellmer | B60J 1/18 |
| | | | | 49/358 |
| 2011/0265381 | A1 | 11/2011 | Guarnizo | |
| 2014/0173984 | A1* | 6/2014 | Schlesiger | H02H 7/0858 |
| | | | | 49/506 |
| 2015/0096693 | A1 | 4/2015 | Fitzgibbon et al. | |
| 2015/0300070 | A1 | 10/2015 | Wuerstlein et al. | |
| 2018/0002968 | A1* | 1/2018 | Endo | E05F 15/40 |

FOREIGN PATENT DOCUMENTS

| | | |
|---|---|---|
| CN | 104832027 A | 8/2015 |
| DE | 20 2005 018 412 U1 | 5/2007 |
| DE | 10 2012 106 927 A1 | 1/2014 |
| EP | 1 455 044 A2 | 9/2004 |
| EP | 1 678 803 B1 | 9/2010 |
| WO | WO 2007/148178 A1 | 12/2007 |

OTHER PUBLICATIONS

German-language Written Opinion (PCT/ISA/237) issued in PCT Application No. PCT/EP2019/059631 dated Sep. 30, 2019 (seven (7) pages).

German-language Search Report issued in German Application No. 10 2018 206 935.2 dated Feb. 28, 2019 with partial English translation (11 pages).

English translation of Chinese Office Action issued in Chinese Application No. 201980028216.X dated Jul. 30, 2021 (nine (9) pages).

* cited by examiner

CONTROL DEVICE AND METHOD FOR CONTROLLING A WINDOW LIFTER WITH ANTI-TRAP PROTECTION FOR A MOTOR VEHICLE

BACKGROUND AND SUMMARY OF THE INVENTION

The invention relates to a control device and to a method for controlling a window lifter with anti-trap protection for a window of a motor vehicle.

Power-operated window lifters, in particular electric window lifters with an electric motor, are installed in current motor vehicles, in particular passenger vehicles, and serve to substantially vertically lift and to lower the window panes of the windows without the operator having to apply the force for moving the window panes (for example by winding). The window is generally closed by lifting the window pane and opened by lowering the window pane.

When a window is closed by means of a power-operated window lifter, a distinction is made between manual closing and automatic closing.

In the case of manual closing, the window moves for as long in the closing direction as the associated operating element, for example a window lifter operating switch in the inside door of the vehicle or in the center console or an operating element on a radio key, is actuated by the operator, for example is pulled.

During automatic closing, continuous actuation of an operating element by an operator is unnecessary for closing the window up to the end of the movement distance. This includes, for example, closing the window by actuation (in particular pulling) of an operating element, which is actuatable in two stages for closing and has two differentiable actuation strokes, where a movement in the closing direction up to the end of the movement distance is brought about and therefore the window automatically closes when the operating element is briefly actuated in the second actuation stage with a higher actuation stroke and, for this purpose, has been actuated, for example, beyond a pressure point. If the operating element is actuated only in the first actuation stage with a lower actuation stroke (for example is actuated only up to the pressure point), the window closes only for as long as the operating element is actuated.

It is prescribed by law that anti-trap protection (also referred to as closing force limitation) has to be provided for the automatic closing. The anti-trap protection serves to stop the closing movement and generally also for reversing the window if the force applied by the side window pane on an object in the movement range of the window exceeds a certain limit. It is thereby ensured that people are not injured by being trapped. This can be implemented in such a manner that the closing movement stops and the window reverses if, depending on the position of the pane, the drive torque exceeds a predetermined limit. When the position of the window is known, it can be ascertained whether there is an obstacle or whether the window has reached the end of the movement distance. The position of the window can be measured at the motor axis via Hall sensors.

Side windows of motor vehicles typically have either only the manual closing mode or alternatively the manual closing mode and the automatic closing mode, wherein anti-trap protection is prescribed for the automatic closing mode. Manual closing does not require an effective closing force limitation. Manual closing permits closing of the windows independently of the availability of the closing force limitation. This is because, during the manual closing, the movement of the windows is always controllable by the operator.

Adequate anti-trap protection cannot be realized in all windows. In particular in the rear region of convertibles and vehicles having window frames with a very oblique extent, a sufficient closing force limitation frequently cannot be realized, and therefore automatic closing generally has to be dispensed with for said windows.

Furthermore, when anti-trap protection is provided, error situations arise in which a sufficient closing force limitation can no longer be guaranteed. This includes in particular the denormalization, i.e. the loss of the absolute position of the window due to mechanical or electrical circumstances. If the functionality of the anti-trap protection may temporarily no longer be guaranteed, the automatic closing mode has to be suppressed for this period of time. For example, when switching the operating element into the second actuation stage (i.e., for example, beyond a pressure point), an automatic closing mode is then suppressed and only a manual closing mode is possible. In this connection, the manual closing mode is then the same with continuous actuation in the first actuation stage and in the second actuation stage.

Error situations are conceivable (for example a jamming/sticking button) which could lead to a malfunction of a window lifter operating element, in particular window lifter button, such that the window moves in the closing direction without the operator actuating the operating element for closing the window. In the event of such a malfunction of the operating element, for example, a defective constant actuating signal could be generated which corresponds to the actuating signal of continuous actuation of the actuating element, and therefore the control unit interprets this defective actuating signal as a closing request and closes the window. If precisely in this highly improbable situation the closing force limitation were additionally also not effective at all or not sufficiently effective and in addition if a body part were situated in the movement range of the window, a person could at least theoretically, with extremely low probability, be trapped and possibly injured.

It is the object of the invention to even further reduce the extremely low probability of trapping of a body part of a person in the event of a malfunction of an operating element.

The object is achieved by the features of the independent patent claims. Advantageous embodiments are described in the dependent claims. It is pointed out that additional features of a patent claim dependent on an independent patent claim can form a separate invention independent of the combination of all of the features of the independent patent claim without the features of the independent patent claim or only in combination with a subset of the features of the independent patent claim, the separate invention being able to be turned into the subject matter of an independent claim, a divisional application or a subsequent application. This applies in the same way to technical teachings described in the description, which are able to form an invention independent of the features of the independent patent claims.

A first aspect of the application relates to a control device for controlling a power-operated window lifter, in particular an electric window lifter with an electric motor, with anti-trap protection for a motor vehicle window, in particular for a side window of a motor vehicle (for example a passenger vehicle).

The control device is preferably an electronic control device which is located on a control unit (for example a window lifter control unit) or else can be distributed across a plurality of control units (for example window lifter control unit and master control unit). The control device preferably operates under software control and can comprise one or more processors which operate via one or more software programs controlled in the manner according to the invention.

A control device of this type is configured to determine that an operating element for closing the window is actuated, and in response thereto, to move the window in the closing direction, in particular (within the context of a manual closing mode) for as long as the operating element is actuated. The operating element is, for example, a window lifter operating element which is arranged as a window lifter operating switch in the inside door of the vehicle or in the center console or on a radio key (or on a touch-sensitive screen of a smartphone provided with an app). However, in the case of a convertible, it may also be an operating element which serves for closing the top and, for this purpose, typically has to be actuated continuously, for example an operating element arranged in the vehicle in the center console or in the inside door of the vehicle, or an operating element on the radio key (or on a touch-sensitive screen of a smartphone provided with an app).

During manual closing, the window moves in the closing direction for as long as the associated operating element, for example a window lifter operating switch in the inside door of the vehicle or in the center console, or an operating element on a radio key, is actuated by the operator, for example is pulled.

The control device can be connected directly to the operating element. The operating element can be connected to a control unit, which is connected between the control device and the operating element, wherein the control device obtains a signal from the control unit indicating the actuation of the operating element when the control unit connected inbetween receives an actuation of the operating element.

For example, in order to close the window, a switch has to be pulled as far as the pressure point. The window closes for as long as the switch is held. An automatic closing mode is preferably also present. For example, the switch has to be pulled beyond a pressure point such that the window automatically closes. The switch has to be, for example, pressed in order to open the window.

The control device is furthermore configured to determine that the functional activity of the anti-trap protection is not (no longer) guaranteed, and, in the event that it has been determined that the functional activity of the anti-trap protection is not guaranteed, to activate the window lifter in response to the actuation of the operating element in such a manner that the window is moved with a lower movement speed in the closing direction in comparison to the movement speed when the functionality is guaranteed.

For example, it is determined (at some point) by the control unit that the functional activity of the anti-trap protection is not (no longer) guaranteed, for example because it has been identified that the absolute position of the window (generally determined by means of a Hall sensor) is not precisely known because of adverse mechanical or electrical circumstances within the context of what is referred to as denormalization. If this state persists and the operator then actuates the operating element for closing the window, the window will move at a lower movement speed than if the functional activity of the anti-trap protection has no restriction.

The lower movement speed when the functional activity of the anti-trap protection is not guaranteed is, for example, only 25% or less, in particular only 10% or less, of the movement speed during full functional activity of the anti-trap protection.

The low movement speed provides a person whose body part (for example arm) is situated in the movement range of the window with more time to remove the body part from the movement range of the window. In addition, another person who may be in the vehicle has more time to be able to provide assistance.

The movement speed can be adapted, for example, via the duty factor of a pulse width modulation (PWM) control signal which is preferably used for activating the window lifter. The PWM control signal can be used, for example, to influence the drive torque and thus also the movement speed.

It would be conceivable to provide pure control of the movement speed or of a variable (e.g. rotational speed or motor torque) associated therewith without feedback.

However, it is generally of advantage in the case of a window lifter if the movement speed is regulated by means of a regulator to a predetermined desired movement speed (or to a variable characteristic thereof, for example the desired rotational speed), thus resulting in a uniform movement. In the event that it has been determined that the functional activity of the anti-trap protection is not guaranteed, a lower value is used for the desired movement speed than when functionality is guaranteed.

If, in the event of the loss of the anti-trap protection because of denormalization, a precise statement regarding the actual position of the window is no longer possible via a Hall sensor, the actual speed or actual rotational speed can nevertheless be ascertained via the Hall sensor such that the speed or rotational speed can be regulated.

A second aspect of the application also relates to a control device for controlling a power-operated window lifter, in particular an electric window lifter with an electric motor, with anti-trap protection for a motor vehicle window, in particular for a side window of a motor vehicle (for example of a passenger vehicle).

The control device is preferably an electronic control device which is located on a control unit or else can be distributed across a plurality of control units. The control device preferably operates under software control and can comprise one or more processors which operate under control of one or more software programs in a manner according to the invention.

The control device is configured to determine that an operating element that is to be actuated for closing the window is actuated, for example by it being determined that the operating element switches over from an unactuated state into an actuated state. When the functional activity of the anti-trap protection is guaranteed, the window lifter is activated in response to the actuation of the operating element (in particular in response to the switching over into an actuated state) in such a manner that the window is moved from the inoperative state in the closing direction, specifically preferably for as long as the actuated operating element remains in the actuated state.

The control device is configured to determine that the functional activity of the anti-trap protection is not guaranteed, as has already been described above.

In the event that it has been determined that the functional activity of the anti-trap protection is not guaranteed, the window lifter is not activated when the operating element is actuated with a single state change of the operating element (in particular not in response to the switching over into an actuated state with a single state change), such that the window is moved from the inoperative state in the closing direction. In this case, the window does not move.

The control device is configured to determine that the operating element that is to be actuated for closing the window is actuated with a predetermined actuation sequence which has more than one single state change, in particular changes from an unactuated state into an actuated state with a predetermined actuation sequence which has more than one single state change. In the even that it has been determined that the functional activity of the anti-trap protection is not guaranteed, the window lifter is activated in response to the actuation of the operating element with the actuation sequence (in particular in reaction to the change into the actuated state with the predetermined actuation sequence) in such a manner that the window is moved from the inoperative state in the closing direction.

By this means, an erroneous movement due to an error in the button can be suppressed when the actuating signal receives a constant continuous value signaling the actuation since, in this case, the wrong movement command is not realized. Instead, for moving the window lifter when anti-trap protection is not present, an actuation sequence with more than one state change is required.

According to a first embodiment of the second aspect, the necessary actuation sequence has repeated actuation of the operating element, i.e. the operating element has to be actuated more than once, for example at least twice or at least three times. For example, in order to trigger the movement, a double actuation of the operating element is necessary. Between the actuations of the operating element, preferably an unactuated position of the operating element has to be detected as part of the predetermined actuation sequence.

In the first embodiment, it is preferably checked whether the repeated actuation, in particular the double actuation, takes place in a predetermined period of time. The period of time begins, for example, from the end of the first actuation (alternatively: at the beginning of the first actuation), i.e. from the end of the first actuation (alternatively: after the beginning of the actuation) it is checked whether a second actuation takes place in this period of time. The predetermined period of time is, for example, within the range of 0.5 s to 5 s, in particular 2 s. The window is moved from the inoperative position in the closing direction if the repeated actuation (for example the double actuation) takes place in the predetermined period of time.

As explained above, it can be provided that the operating element for closing is actuatable in at least two stages (in particular in precisely two stages) with an actuated state of a first stage and an actuated state of a second stage, typically with a different actuation stroke.

When the functionality of the anti-trap protection is guaranteed, typically the actuated state of a first stage is assigned to the manual closing and the actuated state of a second stage is assigned to the automatic closing.

The actuation sequence preferably requires repeated actuation of the operating element in the same stage, for example a double actuation in the first stage or a double actuation in the second stage.

If it is detected that the effectiveness of the closing force limitation cannot be guaranteed, for example manual movement via a single actuation (for example pulling) of an operating element in the first stage or in the second stage is suppressed. Instead, the operating element has to be actuated more than once within a predetermined short period of time in the same stage in order to permit movement of the window in the closing direction. Between the actuations, the neutral position of the operating element preferably has to be detected so that the window is actually moved.

An erroneous movement due to an above-described error in the operating element is therefore suppressed since, in this case, the movement command would not be realized. Only an extremely improbable error leading to a signal indicating a multiple state change between neutral position and actuated position for closing and which is within the predetermined period of time could in any way still trigger an erroneous movement.

In a second embodiment of the second aspect, it is required for the operating element for closing the window to be actuatable at least in two stages with an actuated state of a first stage and an actuated state of a second stage, as has been described above. The necessary actuation sequence comprises switching over from the unactuated state into the actuated state of a first stage and switching over from the actuated state of a first stage into the actuated state of a second stage.

If the effectiveness of the closing force limitation cannot be guaranteed, a manual movement as a result of an actuating signal indicating (erroneously or else correctly) the actuation in the first stage or the second stage is suppressed. Instead, the sequence of an actuated position (neutral position)—actuated position of first stage—actuated position of second stage is absolutely necessary.

A movement of the window in the event of an error involving an actuating signal with actuation in the first stage or with actuation in the second stage, but not the transition between the three positions, is therefore suppressed.

A third aspect of the application relates to a method for controlling a power-operated window lifter with anti-trap protection for a motor vehicle window. The method steps correspond to the manner of operation of the control device according to the first aspect of the application.

The method comprises the following steps:
  determining that the functional activity of the anti-trap protection is not guaranteed; and
  in the event that it has been determined that the functional activity of the anti-trap protection is not guaranteed, activating the window lifter, when the operating element is actuated, in such a manner that the window is moved at a lower movement speed in the closing direction in comparison to the movement speed when the functionality is guaranteed.

The above explanations pertaining to the control device according to the invention according to the first aspect of the application also apply in a corresponding manner to the method according to the invention according to the third aspect of the application. Advantageous exemplary embodiments of the method according to the invention that are not described exclusively at this juncture and in the patent claims correspond to the advantageous exemplary embodiments of the control device according to the invention that are described above or in the patent claims.

A fourth aspect of the application relates to a method for controlling a power-operated window lifter with anti-trap protection for a motor vehicle window. The method steps correspond to the functionality of the control device according to the second aspect of the application.

The method comprises the following steps:
  determining that the functional activity of the anti-trap protection is not guaranteed;
  determining that the operating element that is to be actuated for closing the window is actuated with a predetermined actuation sequence which has more than one single state change of the operating element;

in the event that it has been determined that the functional activity of the anti-trap protection is not guaranteed, not activating the window lifter in response to an actuation of the operating element with a single state change of the operating element in such a manner that the window is moved from the inoperative state in the closing direction, and activating the window lifter in response to an actuation of the operating element with the predetermined actuation sequence in such a manner that the window is moved from the inoperative state in the closing direction.

The above explanations pertaining to the control device according to the invention according to the second aspect of the application also apply in a corresponding manner to the method according to the invention according to the fourth aspect of the application. Advantageous exemplary embodiments of the method according to the invention that are not described exclusively at this juncture and in the patent claims correspond to the advantageous exemplary embodiments of the control device according to the invention that are described above or in the patent claims.

A fifth aspect of the application relates to a software program containing program code for carrying out the method according to the third or fourth aspect when the software program runs on a software-controlled device, in particular on a control unit with a processor.

The invention is described below with reference to three exemplary embodiments with the assistance of the attached drawings.

DETAILED DESCRIPTION OF THE DRAWINGS

Figure 1:
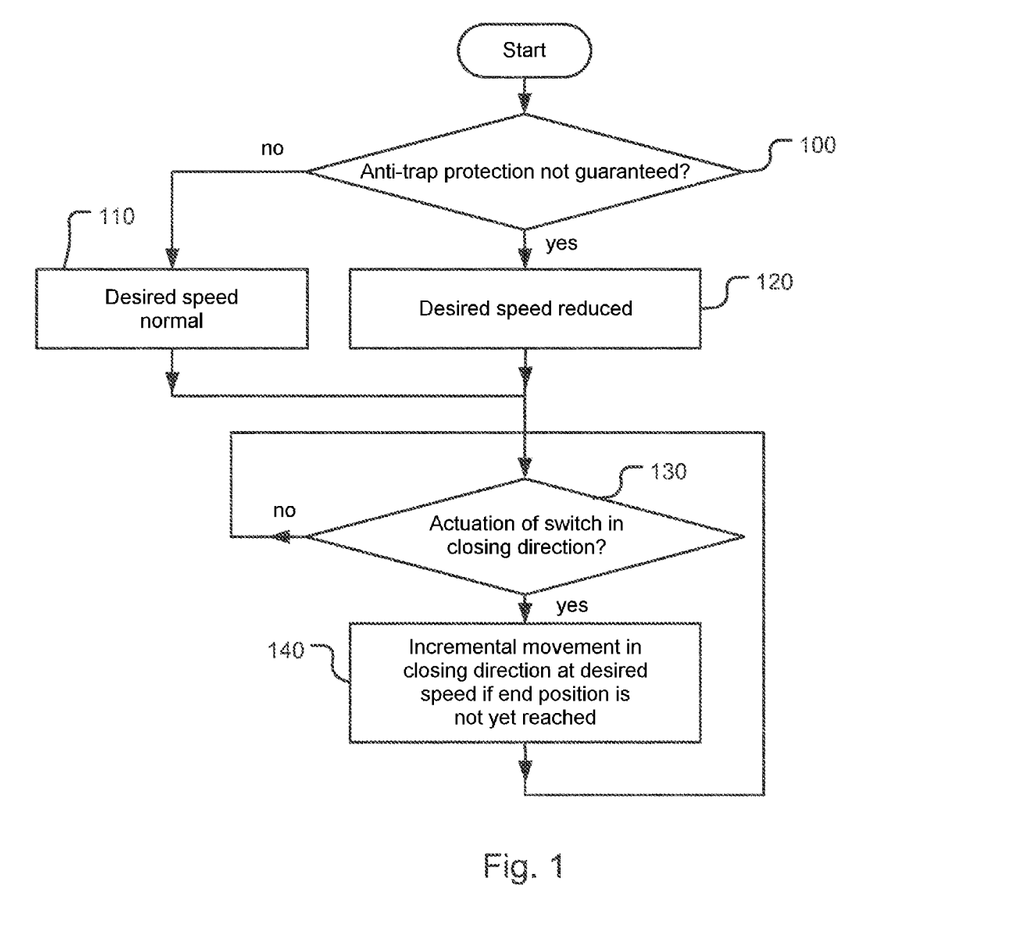
FIG. 1 shows an operating principle of a first exemplary embodiment of a control device according to the invention (according to the first aspect of the application).

In FIG. 1, the operating principle of a first exemplary embodiment of a control device (for example a window lifter control unit) for controlling an electric window lifter is illustrated in a simplified way in the form of a sequence diagram. This involves a control device according to the first aspect of the application. Only the manual closing is illustrated; a possibly provided automatic closing is in any case permissible only when the anti-trap protection is guaranteed, and is not illustrated.

In step 100, it is determined by the control device that the anti-trap protection (actually prescribed for automatic closing) cannot currently be guaranteed, that is to say that the effectiveness of the closing force limitation cannot be guaranteed, for example because the value of the achievable closing force limitation is greater than a prescribed value (for automatic closing) of the closing force limitation or because a closing force limitation is no longer present at all. If the anti-trap protection cannot be guaranteed, in step 120 a reduced value for the desired speed for regulating the speed during manual closing is preset, the value being lower than the preset value of the desired speed when the anti-trap protection is guaranteed (see step 110).

If, in step 130, an actuation of the switch that is directed toward (manual) closing of the window (e.g. pulling of the switch in stage 1 instead of pressing for opening the window) is determined, the window is moved incrementally in the closing direction at the respectively set desired speed (see step 140) if the end position of a completely closed window is not yet reached. The incremental movement in the closing direction is repeated for as long as the switch continues to be actuated in the closing direction.

Figure 2:
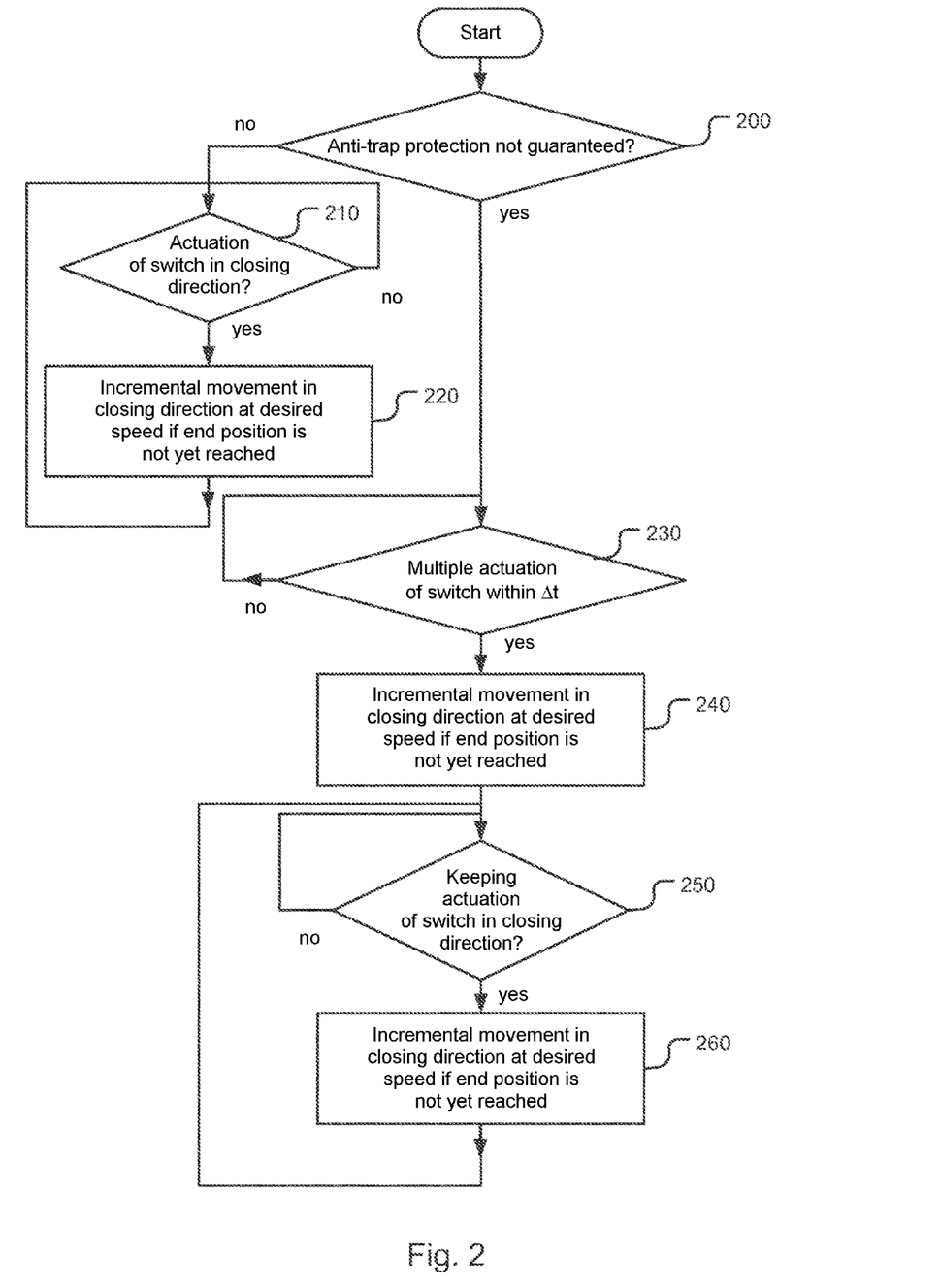
FIG. 2 shows an operating principle of a second exemplary embodiment of a control device according to the invention (according to the second aspect of the application).

In FIG. 2, the operating principle of a second exemplary embodiment of a control device (for example a window lifter control unit) for controlling an electric window lifter is illustrated in a simplified way in the form of a sequence diagram. This involves a control device according to the second aspect of the application.

As explained above with regard to step 100 in FIG. 1, it is determined in step 200 by means of the control device that the anti-trap protection (actually prescribed for automatic closing) cannot be guaranteed. If there is currently no restriction for the anti-trap protection, when the switch is continuously actuated for manual closing (e.g. pulling in stage 1), the window is moved in the closing direction for as long as the switch is held and the end position is not yet reached.

If the anti-trap protection, by contrast, cannot be currently guaranteed, no movement of the window is triggered when the switch is actuated once for manual closing. Instead, the driver has to actuate the switch more than once (see step 230), specifically in a predetermined time $\Delta t$ (e.g. $\Delta t=2$ s; calculated after the end of the first actuation) in order subsequently to initiate a movement of the window in the closing direction (see step 240). If the switch for closing the window is actuatable in two stages with stage 1 (e.g. actuation as far as the pressure point) and stage 2 (e.g. actuation beyond the pressure point), the operator can actuate the switch twice in succession in stage 1 or alternatively twice in succession in stage 2 in order, even if the closing force limitation is not guaranteed, to initiate a movement in the closing direction.

It is then asked in step 250 whether the operator is also continuing to keep the switch actuated after the multiple actuation (in the case of the switch having two stages: keeping the actuation in the respective stage of the preceding actuation). The window is moved further in the closing direction (see step 260) for as long as the continuous actuation persists and the end position for the closing operation has not yet been reached.

Figure 3:
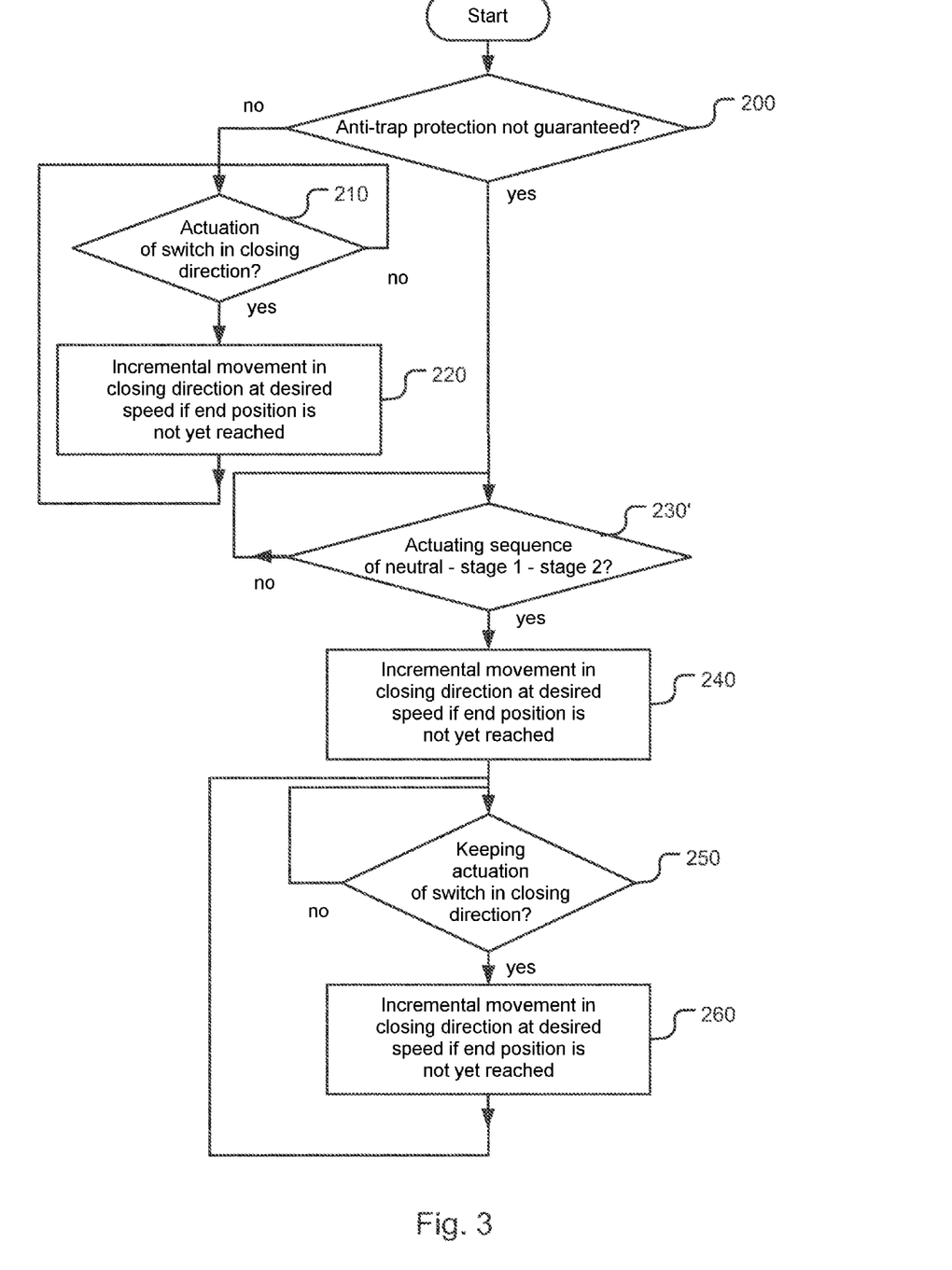
FIG. 3 shows an operating principle of a third exemplary embodiment of a control device according to the invention (according to the second aspect of the application).

In FIG. 3, the operating principle of a third exemplary embodiment of a control device (for example a window lifter control unit) for controlling an electric window lifter is illustrated in a simplified way in the form of a sequence diagram. The third exemplary embodiment differs from the second exemplary embodiment only in that, when the effectiveness of the closing force limitation is not guaranteed, instead of a multiple actuation of step 230 an actuation sequence of neutral-stage 1-stage 2 (without neutral between stage 1 and stage 2) is necessary as a required prerequisite (see step 230') in order to initiate a movement of the window in the direction of the closing direction.

Two or three of the measures in the three exemplary embodiments (reduced movement speed, multiple actuation, actuation sequence of neutral—stage 1—stage 2) can also be combined in one joint exemplary embodiment. If the control of the window lifter is software-based, no development of new hardware or changing existing hardware is necessary for realizing the above-described measures; they can be realized purely by a software program.

Figure 4:
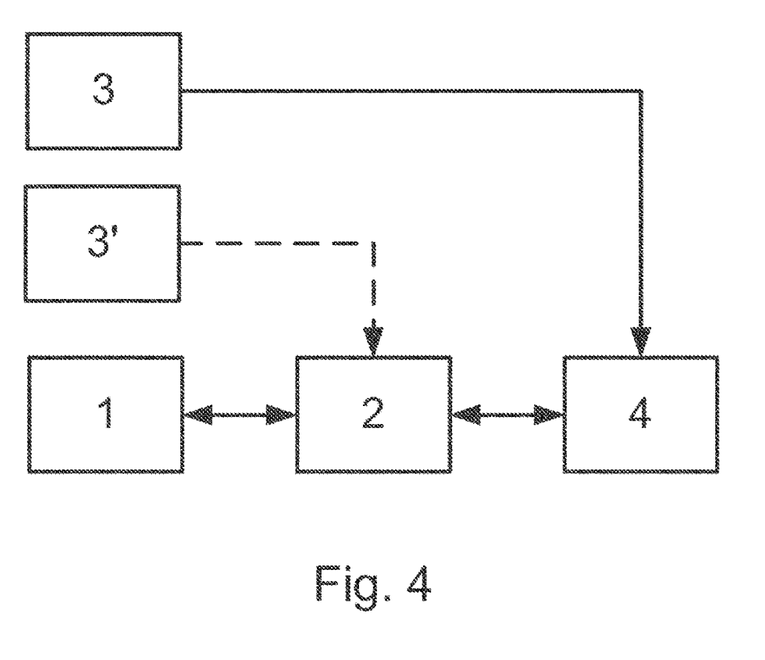
FIG. 4 shows a schematic overview of an exemplary electric window lifter system.

FIG. 4 shows a schematic overview of an exemplary electric window lifter system. A control unit 2 serves for controlling an electric window lifter 1 with an electric motor and one or more Hall sensors for ascertaining the position of the window. The position information of the Hall sensor or the Hall sensors and the drive torque of the electric motor are made available to the control unit 2 from the window lifter 1. The closing force limitation is controlled on the basis thereof in the control unit 2.

It can be provided that a window lifter switch 3' that is to be actuated is coupled (see dashed line) to the window lifter control unit 2 without a further control unit located inbetween. In this case, the window lifter control unit 2 directly receives the actuating signal of the window lifter switch 3'. Said signal is erroneous if there is an error in the window lifter switch 3'. It can also be provided, in the event that the control unit 2 directly receives the actuating signal of the window lifter switch 3', that said signal is transmitted to the master control unit 4 for prioritization if there are a plurality of window lifter switches 3' for the same window, and the control unit 2 activates the window lifter only in response to a message from the master control unit 4 in such a manner that the window is moved.

Alternatively, the window lifter switch 3' as part of a global control panel 3 (with a multiplicity of operating elements) for the door can be connected to a master control unit 4 via a vehicle bus. When the window lifter switch 3' in the control panel 3 is actuated, a corresponding signal is sent from the master control unit 4 to the window lifter control unit 2 to close the door. This signal implicitly indicates that the switch has been actuated. This signal is erroneous when there is an error in the window lifter switch.

A computer product including a non-transitory computer readable medium having stored thereon program code that, when executed on one or more processors, may carry out any of the disclosed methods in accordance with the present subject matter.

What is claimed is:

1. A control device for controlling a power-operated window lifter with anti-trap protection for a motor vehicle window, wherein
the control device configured to:
determine whether anti-trap protection is functional; and
determine that an operating element for closing the window is actuated, and in response:
close the window using the window lifter at a first, lower movement speed based on the determination that the anti-trap protection is non-functional in comparison to a second movement speed when the anti-trap protection is functional.

2. The control device according to claim 1, further comprising:
a regulator for regulating the first movement speed, the second movement speed, or a desired variable characteristic thereof, during closing of the window, wherein the desired variable characteristic is lower when the anti-trap protection is non-functional than when functional.

3. The control device according to claim 1, wherein the anti-trap protection is functional when an absolute position of the window is determinable by the control device.

4. The control device according to claim 1, further comprising:
a window position sensor configured to sense a position of the window.

5. The control device according to claim 4, wherein the anti-trap protection is functional when an absolute position of the window is determinable by the control device using the window position sensor.

6. A control device for controlling a power-operated window lifter with anti-trap protection for a motor vehicle window, wherein
the control device is configured to:
determine whether the anti-trap protection is functional;
determine that an operating element for closing the window is actuated, and based on the determination that the anti-trap protection is functional, activate the window lifter from an inoperative state to close the window in response;
determine that the operating element for closing the window is actuated with a single state change of the operating element and based on the determination that the anti-trap protection is non-functional, not activate the window lifter; and
determine that the operating element for closing the window is actuated with a predetermined actuation sequence having a plurality of single state changes, and based on the determination that the anti-trap protection is non-functional, activate the window lifter from the inoperative state to close the window in response.

7. The control device according to claim 6, wherein the predetermined actuation sequence comprises repeated actuation of the operating element.

8. The control device according to claim 7, wherein the control device is further configured to:
determine whether the repeated actuation takes place in a predetermined period of time, and based on the determination that the anti-trap protection is non-functional, activate the window lifter from the inoperative state to close the window in response.

9. The control device according to claim 7, wherein the operating element for closing the window is actuatable at least in two stages comprising a first actuated stage and a second actuated stage, and
the predetermined actuation sequence comprises repeated actuation of the operating element in a same stage.

10. The control device according to claim 6, wherein the operating element for closing the window is actuatable at least in two stages comprising a first actuated stage and a second actuated stage, and
the predetermined actuation sequence comprises switching over from an unactuated state into the first actuated stage and switching over from the first actuated stage into the second actuated stage.

11. A method for controlling a power-operated window lifter with anti-trap protection for a motor vehicle window, comprising:
determining whether anti-trap protection is functional;
determining that an operating element for closing the window is actuated; and in response:
closing the window using the window lifter at a first, lower movement speed based on the determination that the anti-trap protection is non-functional, in comparison to a second movement speed when the anti-trap protection is functional.

12. A computer product comprising a non-transitory computer readable medium having stored thereon program code that, when executed on one or more processors, carries out the method of claim 11.

13. A method for controlling a power-operated window lifter with anti-trap protection for a motor vehicle window, comprising:
   determining whether the anti-trap protection is functional; and
   determining that an operating element for closing the window is actuated;
   based on the determination that the anti-trap protection is functional, activating the window lifter from an inoperative state to close the window in response; and
   based on the determination that the anti-trap protection is non-functional:
      (i) not activating the window lifter in response to the actuation of the operating element with a single state change, and
      (ii) activating the window lifter from the inoperative state to close the window in response to the actuation of the operating element with a predetermined actuation sequence having a plurality of single state changes.

14. A computer product comprising a non-transitory computer readable medium having stored thereon program code that, when executed on one or more processors, carries out the method of claim 13.

* * * * *